(12) United States Patent
Yu et al.

(10) Patent No.: US 10,291,591 B2
(45) Date of Patent: May 14, 2019

(54) ANTI-EAVESDROPPING SYSTEM FOR MOBILE PHONE COMMUNICATION

(71) Applicant: Felicity Taiwan Corporation, Taipei (TW)

(72) Inventors: Chun Te Yu, Taipei (TW); Chia-Chian Yu, Taipei (TW); Cheng-Hsien Yu, Taipei (TW)

(73) Assignee: Felicity Taiwan Corporation, Taipei (TW)

( * ) Notice: Subject to any disclaimer, the term of this patent is extended or adjusted under 35 U.S.C. 154(b) by 204 days.

(21) Appl. No.: 15/166,263

(22) Filed: May 27, 2016

(65) Prior Publication Data

US 2017/0005996 A1    Jan. 5, 2017

(30) Foreign Application Priority Data

Jul. 1, 2015   (TW) .............................. 104121424 A

(51) Int. Cl.
| | | |
|---|---|---|
| *H04M 1/68* | (2006.01) | |
| *H04L 29/06* | (2006.01) | |
| *H04W 12/02* | (2009.01) | |
| *H04W 76/14* | (2018.01) | |
| *H04W 4/80* | (2018.01) | |
| *H04M 1/60* | (2006.01) | |

(52) U.S. Cl.
CPC ...... *H04L 63/0428* (2013.01); *H04L 63/0471* (2013.01); *H04M 1/6066* (2013.01); *H04W 4/80* (2018.02); *H04W 12/02* (2013.01); *H04W 76/14* (2018.02); *H04M 1/68* (2013.01); *H04M 2250/02* (2013.01)

(58) Field of Classification Search
CPC . H04L 63/04; H04L 63/0428; H04L 63/0471; H04M 1/6066; H04M 1/68; H04M 2250/02; H04W 12/02
See application file for complete search history.

(56) References Cited

U.S. PATENT DOCUMENTS

| | | | | |
|---|---|---|---|---|
| 9,398,361 | B1 * | 7/2016 | Jaques | ................. H04R 1/1041 |
| 2002/0120849 | A1 * | 8/2002 | McKinley | ......... G06F 17/30817 |
| | | | | 713/176 |
| 2004/0083177 | A1 * | 4/2004 | Chen | .................... H04N 7/1675 |
| | | | | 705/50 |
| 2004/0192206 | A1 * | 9/2004 | Hirvonen | ................ H04W 4/80 |
| | | | | 455/41.2 |
| 2006/0212938 | A1 * | 9/2006 | Suzuki | .................... H04L 63/08 |
| | | | | 726/16 |

(Continued)

FOREIGN PATENT DOCUMENTS

| | | | |
|---|---|---|---|
| CN | 102843677 | * | 12/2012 |
| CN | 103986503 A | * | 8/2014 |

*Primary Examiner* — Khang Do
(74) *Attorney, Agent, or Firm* — Min-Lee Teng; Litron Patent & Trademark Office

(57) ABSTRACT

An anti-eavesdropping system for mobile phone communication is disclosed, wherein a mobile phone is paired with a Bluetooth headset for voice data encryption and decryption, the Bluetooth headset having a microprocessor unit to perform encryption and decryption of voice data, wherein the Bluetooth headset transmits the encrypted voice data to the mobile phone, and decrypts the voice data from the mobile phone and outputs the decrypted voice data to a speaker.

9 Claims, 5 Drawing Sheets

(56) References Cited

U.S. PATENT DOCUMENTS

| | | | | |
|---|---|---|---|---|
| 2008/0065496 | A1* | 3/2008 | Fowler | G06Q 20/20 705/16 |
| 2008/0268776 | A1* | 10/2008 | Amendola | H04W 12/06 455/41.2 |
| 2009/0061822 | A1* | 3/2009 | Govindachari | H04M 1/6066 455/411 |
| 2010/0110837 | A1* | 5/2010 | Jung | H04B 11/00 367/137 |
| 2011/0222688 | A1* | 9/2011 | Graham | H04L 63/0428 380/247 |
| 2012/0159617 | A1* | 6/2012 | Wu | G06F 21/445 726/19 |
| 2015/0121347 | A1* | 4/2015 | Petit | G06F 17/5009 717/126 |
| 2015/0124944 | A1* | 5/2015 | Perotti | G06Q 30/01 379/88.01 |
| 2016/0036956 | A1* | 2/2016 | Debates | H04M 1/72525 455/419 |
| 2016/0239717 | A1* | 8/2016 | Muthaiah | G06K 9/2063 |
| 2016/0366115 | A1* | 12/2016 | Khalid | H04L 9/0819 |

\* cited by examiner

ANTI-EAVESDROPPING SYSTEM FOR MOBILE PHONE COMMUNICATION

CROSS-REFERENCES TO RELATED APPLICATIONS

This application claims the priority of Taiwan Patent Application No. 104121424 filed on Jul. 1, 2015, which is hereby incorporated by reference herein and made a part of specification.

BACKGROUND OF THE INVENTION

Field of the Invention

The present invention relates to a digital voice encryption method and a Bluetooth headset device, wherein prevention of electronic eavesdropping is achieved by means of said encryption method, and is in the field of Bluetooth communication and cell phone communication.

Description of the Prior Art

There are two conventional methods of eavesdropping on cell phone communication; the first being electronic surveillance systems setup by government or intelligence agencies for conducting electronic surveillance on a target cell phone number, which is undetectable by the cell phone user. Another way is through cell phone spying software installed on the target cell phone, which typically records conversations and uploads or sends the recordings to another cell phone number or web server.

The differences between the prior art CN102307346B and the present invention are as follow: the structure and method are different from the present invention; the prior art is implemented inside the mobile phone device whereas the present invention is implemented as an external Bluetooth headset device paired with a mobile phone device having a phone application; the prior art uses the infinite sequence of Pi as the encryption method, whereas the present invention uses a hybrid encryption method for a total of over 340 sextillion possible combinations; The disadvantages of the prior art are as follows: only one method of encryption resulting in vulnerabilities; compatibility issues, since encryption will fail if the caller and the receiver are using a different brand of cellphones; inability to upgrade since the encryption is implemented in the circuitry inside the mobile phone in the prior art; and fourth, the prior art does not provide anti-eavesdropping functionality.

SUMMARY OF THE INVENTION

As such, to address the above problems, one technical feature of the present invention is to provide a method of encryption that has over 340 sextillion possible combinations to prevent any attacks; another technical feature of the present invention is the random cryptographic checksum that is sent by both parties so that even if an eavesdropper uses the same mobile phone and Bluetooth device as the present invention, the device will issue a warning message so as to further ensure privacy of the communication.

One embodiment of the present invention provides a communication system, wherein both parties of the communication are using the mobile phone and Bluetooth headset device of the present invention, wherein the Bluetooth headset device performs voice data encryption and decryption. As a result the mobile phone does not need to perform voice data encryption or decryption, resulting in more flexibility regarding the encryption and decryption of voice data.

One embodiment of the present invention discloses a hybrid voice data encryption method, which is a hybrid encryption method comprising a parameterized encryption method and a time slot variation method, wherein the encryption parameter/time slot constant declaration will notify the receiver of the encryption parameters and time slot declaration.

The present invention provides an anti-eavesdropping mobile phone communication system, the system comprising: a first mobile phone device comprising a first built-in Bluetooth module; and a first Bluetooth headset device, wherein the first Bluetooth headset device comprises a lithium-ion battery that provides the power needed for the first Bluetooth headset device; a Bluetooth controller unit for connecting to the built-in Bluetooth module in the first mobile phone device for transmitting data; and a microprocessor unit for performing encryption and decryption, wherein a first terminal of the microprocessor unit is coupled with the Bluetooth controller unit, a second terminal of the microprocessor unit is coupled with a microphone and an A/D converter, and a third terminal of the microprocessor unit is connected to the D/A converter and a speaker, wherein the microprocessor unit encrypts a first voice data outputted by the microphone and the A/D converter, sends the encrypted first voice data to the first mobile phone device through the Bluetooth controller unit, and decrypts an encrypted second voice data received by the first mobile phone device through the Bluetooth controller unit, outputting the decrypted second voice data through the D/A converter and the speaker.

In one embodiment, the microprocessor unit of the Bluetooth headset device further comprises an embedded firmware for performing encryption and decryption, wherein the encryption includes a parameterized encryption and a time slot variation method.

In one embodiment, the first mobile phone device sends a set of passcodes to the Bluetooth headset device, wherein the Bluetooth headset device stores the set of passcodes and the serial number of the Bluetooth headset device for associating the first mobile phone device with the Bluetooth headset device.

In one embodiment, the first mobile phone device uses at least one of the following wireless technologies: GSM, CDMA, CDMA2000, WCDMA, TD-SCDMA and LTE.

In one embodiment, the first mobile phone device sends an encryption command and a time stamp to the Bluetooth headset device, wherein after receiving the encryption command and the timestamp, the microprocessor unit randomly generates a randomly generates an encryption parameters and a time constant, sends out an encryption parameter/time constant declaration, and transmits the voice data to the mobile phone after encryption.

In one embodiment, the microprocessor unit of the Bluetooth headset device comprises an embedded firmware for encryption and decryption, wherein a set of program codes is sent from the first mobile phone device to the microprocessor unit for updating an encryption program in the embedded firmware upon issuing an update command.

In one embodiment, the passcode further comprises a synchronization code, a checksum encryption declaration, a time stamp and the serial number of the Bluetooth headset device.

BRIEF DESCRIPTION OF THE DRAWINGS

The foregoing aspects and many of the accompanying advantages of this invention will become more readily

DETAILED DESCRIPTION OF THE INVENTION

Figure 1:
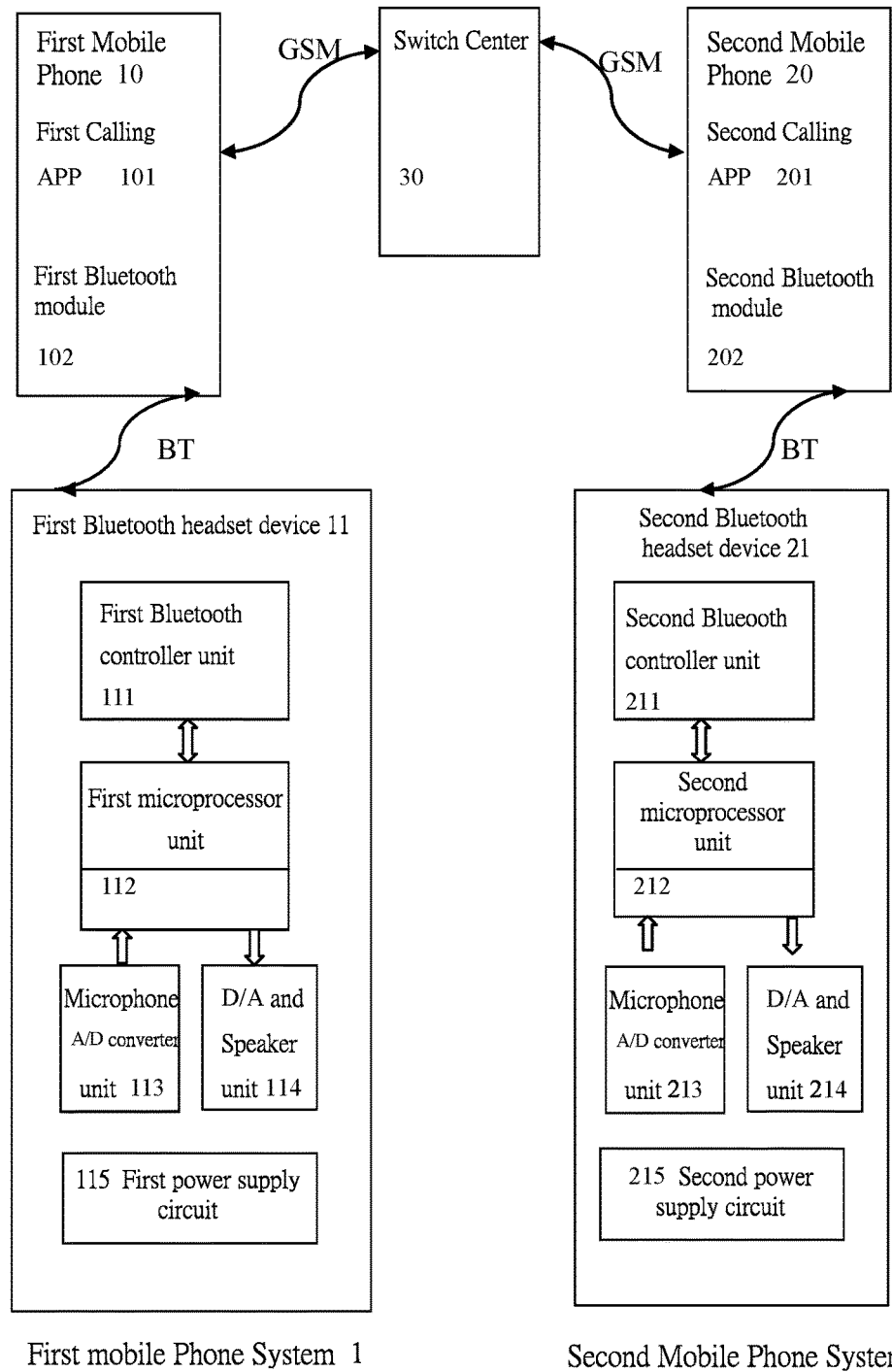
FIG. 1 illustrates the system structure of a preferred embodiment of the invention.

Please refer to FIG. 1, in which the structure of the communication system of the present invention is illustrated. Both parties of communication respectively use the Bluetooth headset devices 11 and 21 of the present invention to perform encryption and decryption, while also using mobile phone devices comprising built-in Bluetooth modules 102 and 202 to engage in encrypted voice data communication, wherein only non-encrypted voice data communication can be used when either one of the said parties does not use the Bluetooth headset devices of the present invention. The above system structure is a technical feature of the present invention. Compared to the structure of the prior art, the present invention has 100% compatibility with any mobile phone that uses digital voice communication, regardless of the brand of the mobile phone, the mobile chipset of the mobile phone or the operating system of the mobile phone. The calling app 101 and 201 are applications executed on said mobile phones, their main functionality comprising: reading the contacts stored on the mobile phone, transmitting the pass code of the user to the Bluetooth headset device, pinging the other party of communication, deciding whether the communication is encrypted and alerting the user when verification of the checksum fails in either of the Bluetooth headset devices.

Please refer to FIG. 1, in which the internal structure of the first and second Bluetooth headset device is illustrated. The power supply circuits 115 and 215 comprise a lithium-ion battery to supply power for the internal electrical circuitry of the Bluetooth headset device. The Bluetooth controller units 111 and 211 are the main controller of the Bluetooth headset device and comprise an embedded firmware, a radio frequency and an antenna for communicating with the built-in Bluetooth module 102 and 202 inside the mobile phone devices. A first microprocessor unit 112 is coupled with the Bluetooth controller unit 111, the first microphone and A/D converter 113 and the first D/A converter and speaker 114. The first microprocessor unit 12 is mainly used for: (1) receiving commands from the calling app 101 on the mobile phone device 10 when making a call to determine whether said call is encrypted, wherein if said call is encrypted, sending a checksum comprising a user inputted pass code stored in the first microprocessor unit 12, the timestamp on the mobile phone device, the serial number of the Bluetooth headset device and any initialization codes. The encrypted voice data is then sent out in intervals using time slots. The encrypted voice data is obtained by first receiving inputted voice data from the first microphone and A/D converter 113, which is then encrypted by the first microprocessor unit 112 using a parameterized encryption method. (2) When accepting a call, receiving a checksum and encrypted voice data from the caller, decrypting the encrypted voice data and outputting said voice data through the first D/A converter and speaker 114. When the first microprocessor unit 112 receives a checksum from the other party of communication, the checksum is decrypted and then verified against the stored checksum of the other party of communication. If the two checksums match then its own checksum will be sent for verification, whereas if the two checksums do not match, the calling app 101 and 201 will alert the users. The above-mentioned checksum structure, parameterized encryption method, time slot variation method and checksum verification are all technical features of the present invention.

Before communication can happen, two steps must be completed. The first step is pinging between one's own mobile phone and its paired Bluetooth headset device. When pinging, the user must set a password in the calling app 101/201. The first microprocessor unit 112 also comprises a serial number of the Bluetooth headset device, wherein the checksum is derived from the above two identifications and stored inside the first microprocessor unit 112 in the Bluetooth headset device. The second step is pinging between the first mobile phone system 1 and the second mobile phone system 2. Both systems respectively send out their checksums and store the checksum received from the other party of communication in the first microprocessor unit 12 and second microprocessor unit 212. In other words, both systems must first obtain the checksums from the other party before communication can happen.

Communication between both parties of communication comprises the steps of: First, the first mobile phone (the caller) sends out its checksum, while the second mobile phone receives and verifies the checksum. When communicating, the calling app 101 on the first mobile phone device will display contacts on the screen, wherein a call will be placed after the user selects a phone number and sets encryption settings. When the call is placed, the calling app 101 on the first mobile phone device 10 will send an encryption command and a timestamp to the first Bluetooth headset device 11. The first microprocessor unit 112 in the first Bluetooth headset device then sends out a checksum, which is sent out through the built-in Bluetooth module inside the first mobile phone device and the antenna of the first mobile phone device. The checksum is an encryption of the pass code set by the user of the first mobile phone device 10, the serial number of the first Bluetooth device and a timestamp.

Second, the second mobile phone device 20 receives the checksum from the first mobile phone device 10 and upon verification, sends out its own checksum in return, which is in turn received and verified by the first mobile phone device. Step 2 is the same as Step 1, which completes the important step of verifying the identities of both parties. If either party fails to verify the received checksum, the user will be alerted through the calling app 101 and 201.

Third, the process of sending and receiving encrypted voice data comprises the steps of: 1. Sending encrypted voice data. Analog voice data is picked up by a microphone on the first Bluetooth headset device 11, which is then converted to digital voice data by the first microphone and the A/D converter 113. The digital voice data is outputted to the first microprocessor unit 112, wherein the first microprocessor unit 112 randomly generates encryption parameters and encrypts the voice data, randomly generates a time slot constant, and sends the above-mentioned data to the Bluetooth controller unit 111. The Bluetooth controller unit will then send the checksum, the encryption parameter/time constant declaration and the encrypted voice data to the built-in Bluetooth module 102 on the first mobile phone device, which is then sent out by the first mobile phone device 10. (2) Receiving encrypted voice data. After receiving the encrypted voice data, the second mobile phone device 20 will transmit the encrypted voice data to the second Bluetooth headset device 21 through the built-in Bluetooth module 20, wherein the Bluetooth controller unit 211 in the second Bluetooth headset device 21 will send the encrypted digital voice data to the second microprocessor unit 212, wherein the second microprocessor unit 212 will decrypt the encrypted digital voice data and output the decrypted digital voice data through the second D/A converter and speaker 214.

During communication, both parties of communication will send out an encryption parameter/time slot constant declaration to the other party at the beginning of the first time slot, wherein the time slot constant declaration is for notifying the other party of the time slot that will be used for the current communication, and the encryption parameter declaration is for notifying the other party of the encryption parameters used for said time slot to allow for decryption. During communication, the checksum is sent out during the first time slot, and randomly sent out during subsequent time slots so as to verify the identity of both parties. The microprocessor units 112 and 212 of the Bluetooth headset devices of both parties will verify the checksums and alert the user through the calling app if verification of the checksum fails.

The encryption method of the present invention is a hybrid encryption method and is not limited to the descriptions below. Generally speaking, the encryption method comprises a parameterized encryption and a time slot variation method.

Figure 2:
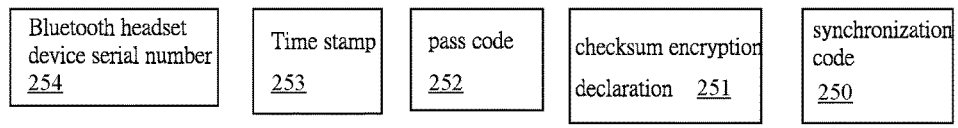
FIG. 2 illustrates the data structure of the checksum.

Another technical feature of the present invention is that both parties of communication will send out their own checksum during transmittal of digital voice data. In each call, both parties will send out their checksum multiple times for verification, wherein a checksum must be sent in the first time slot and are randomly sent out during subsequent time slots, such as in Time Slot 2, 5, or 8. FIG. 2 illustrates the data structure of the checksum, which comprises five portions: a synchronization code, an encryption checksum declaration, the passcode of the caller, the timestamp, and the serial number of the Bluetooth headset device of the caller, wherein the synchronization code is a 3 byte value, such as 11h, EEh, 55h.

The encryption checksum declaration as mentioned above is defined as the declaration of the encoding parameters used for encoding the checksum, for notifying the other party of communication of the encoding parameters used so that the checksum may be decoded. In other words, in each call, the checksum sent in each time slot are not the same, since different encoding parameters are used each time. After the receiver receives the checksum, decodes it, and verifies the data against the data stored in the microprocessor unit, the receiver will send out its own checksum so as to complete the handshake. If the verification fails, the calling app on the mobile phone device will alert the user.

Based on the above description, if an eavesdropper purchases the Bluetooth headset device and mobile phone of the current invention, and also happens to possess a SIM card with the same number as the receiver, the Bluetooth headset device will automatically send out a checksum, which will alert the caller of an eavesdropper since it has received an "extra" checksum.

In a preferred embodiment, please refer to FIG. 1. The system comprises a first mobile phone system 1, a second mobile phone system 2 and a switch center 30. The first mobile phone system comprises a first mobile phone device 10 and a first Bluetooth headset device 11. The second mobile phone system comprises a second mobile phone device 20 and a second Bluetooth headset device 21. The structure and features of the present invention will be described in accordance with FIG. 1. The first mobile phone device 10 and the second mobile phone device 20 are phones respectively comprise built-in Bluetooth modules 102 and 202 and calling apps 101 and 201. The switch center 30 is a mobile communication network capable of at least one of the following standards: GSM, CDMA, CDMA2000, WCDMA, TD-SCDMA and LTE, for exchanging digital voice data between the first mobile phone device and the second mobile phone device. The first Bluetooth headset device 11 and the second Bluetooth headset device 21 comprise: power supply circuits 105 and 205, which comprise lithium-ion batteries 115 and 215 for providing power to the Bluetooth headset device. The Bluetooth controller units 111 and 211 are respectively coupled to the first microprocessor unit 112 and the second microprocessor unit 212 for exchanging messages with the first mobile phone device 10 and the second mobile phone device 20. The Bluetooth controller unit 111 and 211 will respectively send any received messages to the first microprocessor unit 112 and the second microprocessor unit 212 and also transmit any messages the first microprocessor unit 112 and the second microprocessor unit 212 sends out. Both received and sent messages comprise a checksum, an encryption/time slot constant declaration and encrypted voice data. The first microprocessor unit 112 and the second microprocessor unit 212 are single chip microprocessors comprising an embedded firmware 1121, wherein a first terminal of the first microprocessor unit 112 is coupled to the Bluetooth controller unit 111, a second terminal of the first microprocessor unit 112 is coupled to the first microphone and D/A converter 113, and a third terminal of the first microprocessor unit 112 is coupled to the first D/A converter and speaker unit 114; and a first terminal of the second microprocessor unit 212 is coupled to the Bluetooth controller unit 211, a second terminal of the second microprocessor unit 212 is coupled to the second microphone and D/A converter 213, and a third terminal of the second microprocessor unit 212 is coupled to the second D/A converter and speaker unit 214

For sending messages, the path of the voice data is as described: digital voice data is inputted to the first microprocessor unit 112 from the first microphone and D/A converter 113 and outputted to the Bluetooth controller unit 111 after encryption for transmittal to the built-in Bluetooth module 102 in the first mobile phone device. For receiving messages, the path of the voice data is as described: encrypted digital voice data is received by the built-in Bluetooth module on the mobile phone and transmitted to the Bluetooth controller unit 111 in the Bluetooth headset device 11. The encrypted voice data is then sent to the first microprocessor unit 112, decrypted, and then outputted through the D/A converter and speaker unit 114.

Another technical feature of the present invention is when pinging between the first mobile phone device 10 and the first Bluetooth headset device 11, the first calling app 101 sends a set of pass codes to the first Bluetooth head set device 11, wherein the set of pass codes is stored in the first microprocessor unit 112; and when pinging between the second mobile phone device 20 and the second Bluetooth headset device 21, the second calling app 201 sends a set of pass codes to the second Bluetooth head set device 21, wherein the set of pass does is stored in the second microprocessor unit 212.

Another technical feature of the present invention is when pinging between the first mobile phone system and the second mobile phone system, both parties of communication will send checksums, wherein the checksums comprise a synchronization code, a checksum encryption parameter declaration, a pass code, a timestamp and the serial number of the Bluetooth headset device.

Another technical feature of the current invention is that the communication between the first mobile phone system and the second mobile phone system is encrypted. Please refer to FIG. 5. During communication, the calling app 101 will send an encryption command and a timestamp to the first Bluetooth headset device 11. The first Bluetooth headset device 11 will send a first checksum, a first encryption parameter/time slot constant declaration, and encrypted voice data. The second mobile phone system will receive and verify the first checksum, decrypt the encrypted voice data, and output the decrypted voice data. The second Bluetooth headset device 21 will randomly generate encryption parameters and a time slot constant, and send out a check sum and a declaration associated with said encryption parameters and the time slot constant with the encrypted voice data.

The first microprocessor unit 112 of the first Bluetooth headset device 11 reads in the voice data inputted through the first microphone and A/D converter 113. The first microprocessor unit 112 of the first Bluetooth headset device 11 will encrypt the inputted voice data according to the encryption parameters and sends the encrypted voice data to the first Bluetooth controller unit 111. The first Bluetooth controller unit 111 of the first Bluetooth headset device 11 then sends the encrypted digital voice data to the built-in Bluetooth module 102 of the first mobile phone device 10, which is in turn sent out by the first mobile phone device. The second system decrypts the encrypted voice data and outputs the voice data, comprising the steps of: The second microprocessor unit 212 in the second Bluetooth headset device reads the first checksum and the first encryption parameter/time slot constant declaration to decrypt the encrypted voice data, wherein the decrypted voice data is outputted through the second D/A converter and speaker 114. The second mobile phone system will receive and verify the first checksum, and upon successful verification, randomly generate encryption parameters and a time slot constant, and send out a check sum and a declaration associated with said encryption parameters and the time slot constant with the encrypted voice data, wherein obtaining and sending the encrypted voice data comprises the steps of: reading in inputted voice data through the microphone and A/D converter, which is then encrypted by the second microprocessor unit according to the encryption parameters; sends the encrypted voice data to the second Bluetooth controller unit which in turn transmits the encrypted voice data to the second mobile phone device, where it is then sent out through the built-in Bluetooth module inside the second mobile phone device.

Another technical feature of the present invention is the first mobile phone device updating the encryption method of the first Bluetooth headset device and the first microprocessor unit; and the second mobile phone device updating the encryption method of the second Bluetooth headset device and the second microprocessor unit. Upon issuing an encryption update command, the calling app will transmit a set of microprocessor source code to the first microprocessor unit 112. After receiving the encryption command and timestamp, the first microprocessor unit 112 of the first Bluetooth headset device 11 will read in inputted digital voice data from the first microphone and D/A converter 113, encrypt the voice data and send the encrypted voice data to the built-in Bluetooth module of the first mobile phone device 10. The encrypted voice data is then sent to the switch center 30 by the first mobile phone device 10. The received encrypted digital voice data from the switch center 30 is then sent to the second Bluetooth headset device 21 through the second built-in Bluetooth module 202 on the second mobile phone device 20. After receiving the encrypted voice data, the second microprocessor unit 212 in the second Bluetooth headset device 21 will decrypt and output the voice data through the second D/A converter and speaker 214. The first mobile phone device 10 and the first Bluetooth headset device 11 are standard equipment for one party of the communication and the second mobile phone device 20 and the second Bluetooth headset device 21 are standard equipment for the other party of communication. The first mobile phone device 10 and the second mobile phone device 20 are both 3G mobile phones, 3.5G mobile phones, 4G mobile phones, or newer. The above mentioned first mobile phone device 10 and second mobile phone device 20 both comprise built-in Bluetooth modules for communicating with an external Bluetooth headset device. The above mentioned mobile phones also comprise calling apps 101 and 201, which is executed on operating systems such as iOS, Android and Windows Phone. The first Bluetooth headset device 11 comprises a Bluetooth controller unit 111, a first microprocessor unit (encryption/decryption) 112, a MIC, A/D converter 113, D/A converter, speaker unit 114 and a power supply circuit.

Another technical feature of the present invention is pinging between the first mobile phone device 10 and the first Bluetooth headset device 11. In a preferred embodiment, the calling app 101 will send a set of pass codes to the first Bluetooth headset device 11 when the first mobile phone device pings the first Bluetooth headset device 11, which is then stored in the first microcontroller unit 112; and the calling app 201 will send a set of pass codes to the second Bluetooth headset device 21 when the second mobile phone device pings the second Bluetooth headset device 21, which is then stored in the first microcontroller unit 212.

In another preferred embodiment of the present invention, please refer to FIG. 2 which illustrates the structure of the checksum. The checksum is sent out in the following order: synchronization code 250, checksum encryption declaration 251, pass code 252, time stamp 253, and the serial number of the Bluetooth headset device 254. The checksum encryption declaration 251 comprises 4 bytes, wherein the four bytes denote the timestamp, the pass code, the serial number of the Bluetooth headset device and their order. For example: 41h, 08h F5h and 39h can represent:

41h: The order of the time stamp, pass code and serial of the Bluetooth headset device, for a total of 3 possible orders. The 4 indicates that the size of the time stamp is 4 bytes.

08h: The encryption method for the time stamp is the 8th encryption method

F5h: The encryption method for the pass code is the $245^{th}$ encryption method 39h: The encryption method of the serial number of the Bluetooth headset device is the $39^{th}$ encryption method There are in total 3×256×256×256=50,331,648 possible combinations for the checksum encryption parameters, which is roughly equivalent to 50 million possible combinations. It is trivial to modify the checksum to increase the number of possible combinations, such as altering the order of the day, date, year, month, hour and second of time stamp, or even using the lunar year calendar for the date.

The time stamp is composed of 4-10 ASCII characters representing the year, month, date, day, hour and second. The encoding method and order of the timestamp in the checksum will be randomly generated by the above mentioned checksum encryption declaration. Since time is always changing, even if an eavesdropper manages to obtain and send a copy of a previous checksum, it is easily detected as timestamp will have expired.

The passcode (of the caller) is an 8-16 character sequence of alphanumeric ASCII characters. Therefore, the pass code for each call is different and the total number of encryption methods for the pass code is 256.

The serial number of the Bluetooth headset device is a 36 character alphanumeric sequence which is unique to each Bluetooth head device, with a total of 256 possible encryption methods. The technical features of the checksum are as follows:

(1) Apart from the first time slot in which a checksum must be sent out, checksums are randomly sent out for subsequent time slots. Once a checksum is sent out, the receiver must verify the received checksum so as to prevent eavesdropping.
(2) The length of the checksum is variable
(3) Since the time stamp is different for each checksum, each checksum is different
(4) Each of the time stamp, pass code and serial number have their own 256 possible encryption methods The structure of the checksum, encryption method and random generation are all technical features that are not disclosed in the prior art. Since a receiver must also send their checksum, an eavesdropper cannot simply listen in without being detected.

Another technical feature of the present invention is the encryption of digital voice data using a hybrid encryption method that consists of a parameterized encryption method and time slot variation method, wherein the caller declares the encryption parameters and time slot constants for a call using the encryption parameter/time slot declaration. The declaration is a 4-byte data structure along with a prefix code. For example the encryption parameter/time slot declaration 69h, 31h, 01, 0Fh represent:

69h, indicates the offset, which must be subtracted when decoding 31h, wherein the number 3 indicates the number of randomly padded bytes and 1 indicates the order of the padding. For example, in 34h, 56h, F3h, 06h, only 34h is a valid byte whereas the rest are randomly padded bytes.

21h, wherein the 1 represents Nibble-swap. In other words, the bits in position 0-3 need to be swapped with the bits in position 4-7 when decoding. For example, 34h should be decoded as 43h. The 2 represents the order of the permutation of offsetting, padding and nibble swap.

0Fh, wherein 0Fh represents the time constant. In other words, the time constant is 15 seconds, which means that the encryption parameters will change every 15 seconds. Therefore, in a 1 minute call, the encryption parameters will be changed 4 times.

There are three different types of synchronization codes, which are prefixed onto the checksum, the encryption parameter/time slot declaration, and the encrypted voice data. All three types of synchronization code are 3 byte values:

Checksum synchronization code 11h, EEh, AAh
Encryption parameter/time slot declaration synchronization code 33h, CCh, AAh
Encrypted voice data synchronization code 55h, AAh, 55h A time slot is defined as a time interval randomly defined by the microprocessor unit in the Bluetooth headset device when it begins to transmit encrypted voice data. For example, the random time interval can be 10 or 15 seconds, which is now known as the time slot. Time slots can be between 1 and 60 seconds.

One embodiment of the present invention implements the encryption and decryption in the first Bluetooth controller unit 112 and the second Bluetooth controller unit 212 in the Bluetooth headset devices. One embodiment of the present invention uses a hybrid encryption method that consists of a parameterized encryption method and a time slot method which uses a different parameterized encryption method for each time slot. The parameterized encryption method comprises at least one of offsetting, padding, or nibble swap for a total of 2048 possible combinations. If we consider the order of the above 3 methods we have 2048×6=12,288 possible combinations. The offsetting, padding and nibble swap are described as follows.

1. Offsetting. Offsetting the original byte by another byte for a total of 256 possible combinations. For example, if the original byte is 23h and the offset is 1AH then the original byte will become 3DH. If the offset causes the original byte to overflow (exceeds FFh), the result will be truncated to a length of 1 byte. In addition, the original byte refers to the byte that is converted from analog voice data received from the microphone.

2. Padding. Padding the original by a set of random bytes. If the number of random bytes is 3, there are in total 4 possible combinations:

$1^{st}$: Original Byte First Random Byte Second Random Byte Third Random Byte $2^{nd}$: First Random Byte Original Byte Second Random Byte Third Random Byte $3^{rd}$: First Random Byte Second Random Byte Original Byte Third Random Byte $4^{th}$: First Random Byte Second Random Byte Third Random Byte Original Byte The number of possible random bytes can be increased.

3. Performing Nibble Swap on the original byte. Nibble swap is defined as swapping the bits in position 1-4 with the bits in position 5-8 for two possible combinations. For example, D7h can be nibble swapped to 7Dh.

In summary, the parameterized encryption method has in total 256×4×2=2,048 possible combinations. If we consider the order of the above three methods, we have in total 2,048×6=12,288 possible combinations.

Time slot variation. Time slot variation is defined as changing the encryption parameters for each time slot, wherein a timeslot is a predefined number of seconds. Different encryption parameters are used for each time slot, and thus "time slot" can also be called time packets. Both parties of communication can randomly set a fixed number of seconds for each call as the timeslot. For example, the Bluetooth headset device sets the time slot at 30 seconds for a call. One set of encryption parameters will be used from the start of the call to 30 seconds into the call. From the 31th second to the $60^{th}$ second, another set of encryption parameters will be used. In other words, 2 sets of encryption parameters will be used in the 60 seconds of the duration of the call. Since there are 12,288 possible encryption parameters as previously mentioned, there are 12,288×12,288=150,994,944 possible encryption methods for the duration of the call, roughly equivalent to 150 million possible combinations. Likewise, if the time slot is instead 20 seconds, there will be 12,288^3=1,855,425,871,872 possible combinations, roughly equivalent to 1.8 trillion possible combinations, which is unbreakable. Furthermore, if both parties of communication use their own encryption parameters the total possible number of combinations reaches 12,288^6=3,442,605,166,011,971,360,784,384 possible combinations, roughly equivalent to 3.4 septillion possible combinations, which is an astronomical number.

The decryption method of the present invention is the inverse of the encryption method. One technical feature of the present invention is its many possible combinations, yet simple encryption and decryption.

An eavesdropping mobile phone software exists on the market, wherein the software records any calls made on the phone to disk and then transmits the recordings to a server or another phone at a later time. This type of software will not work for the present invention, since all voice data is encrypted. Even if an eavesdropper manages to obtain the encrypted voice data, it is impossible to break the encryption.

Figure 3A:
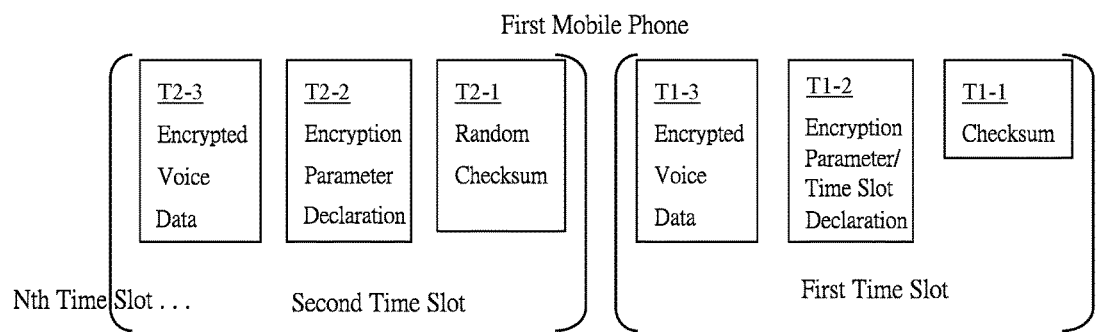
FIG. 3A-3B illustrates the transmittal of encrypted voice data.

In another preferred embodiment, please refer to FIG. 3A, wherein the transmittal of encrypted voice data is illustrated. The upper half depicts the first mobile phone device transmitting encrypted voice data, and the lower half illustrates the second mobile phone device transmitting encrypted voice data, wherein the structure of the upper half and the lower half are identical.

Figure 3B:
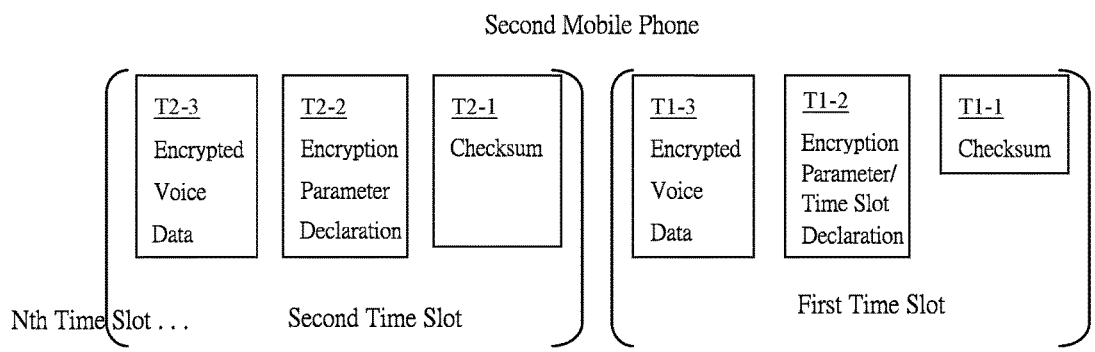
Figure 4:
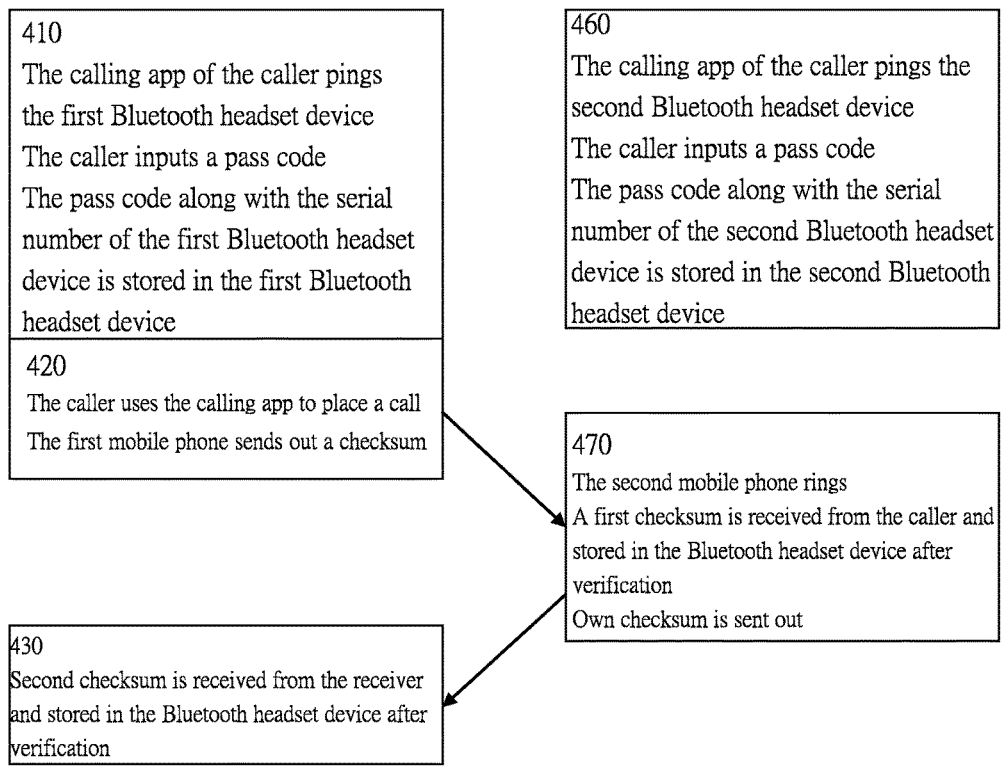
FIG. 4 depicts the flowchart for obtaining and storing the checksum.

In the upper half of FIG. 3B, the first mobile phone device 10 transmits data to the second mobile phone device 20, wherein the transmittal of the data is split into a first time slot and a second time slot. The first time slot comprises three portions, a checksum, an encryption parameter/time slot constant declaration and encrypted voice data. The second time slot also comprises three portions, a checksum, an encryption parameter/time slot constant declaration and encrypted voice data. The difference between the data transmitted in the first and second time slot is that there does not need to be a time slot declaration in the encryption parameter/time slot constant declaration for the second time slot. In addition, the checksum is randomly sent out for the second time slot. In other words, the time slot declaration and checksum are only absolutely required in the first time slot. For the second time slot and any subsequent time slots, checksums are randomly sent out. For example, if a duration of a call is 5 minutes and the time slot declaration is 30 seconds, then there will be 10 time slots, wherein each time slot is 30 seconds. In addition, the checksum will be sent at least once in the 10 time slots. The checksums are used to prevent eavesdroppers from intercepting and eavesdropping on a conversation.

Step 410 and Step 460 are prerequisites steps for establishing the checksums and pinging between the Bluetooth headset devices and the mobile phone devices. In step 410, the first mobile phone device 10 pings the first Bluetooth headset device and in step 460, the second mobile phone device pings the second Bluetooth headset device.

In step 410, the calling app 101 is executed on the first mobile phone device 10 and a user passcode is inputted into the first calling app 101. The user passcode and timestamp is then transmitted to the first Bluetooth headset device 11. After receiving the user passcode and timestamp, the first Bluetooth headset device 11 will store the user passcode and time stamp along with its own serial number into the first microprocessor unit 112, and notify the first calling app 101 upon completion.

In step 460, the calling app 201 is executed on the second mobile phone device 10 and a user passcode is inputted into the second calling app 201. The user passcode and timestamp is then sent to the second Bluetooth headset device 21. After receiving the user passcode and timestamp, the second Bluetooth headset device 21 will store the user passcode and time stamp along with its own serial number into the second microprocessor unit 212, and notify the second calling app 201 upon completion.

Another technical feature of the present invention is that the first mobile phone system (comprising the first mobile phone device 10 and the first Bluetooth headset device 11) and the second mobile phone system (comprising the second mobile phone device 20 and the second Bluetooth headset device 21) will ping each other. In a preferred embodiment, during pinging, both systems will transmit a checksum comprising a synchronization code, a checksum encryption declaration, a passcode, a timestamp and serial number of Bluetooth headset device.

In steps 420, 470, 430, both parties of communication establish the checksums of the other party:

In step 420, the first mobile phone device 10 executes the calling app 101 and calls the phone number of the second mobile phone device. After the call connects, the first Bluetooth headset device 11 will send out a checksum, wherein the checksum is sent out through the first mobile phone device 10.

In step 470, the second mobile phone device 20 will ring. After the user picks up, the second mobile phone device 20 will receive the first checksum sent out by the first mobile phone device 10 and store the first checksum and timestamp in the second microprocessor unit 212. The second Bluetooth headset device 21 will then send out its own checksum.

In step 430, the first Bluetooth headset device 11 will store the second checksum sent out by the second mobile phone device 20 in the first microprocessor unit 112 after it is received from the first mobile phone device 10.

Another technical feature of the present invention is that the communication between the first mobile phone system and the second mobile phone system is encrypted. In a preferred embodiment, the calling app 101 will send an encryption command and a timestamp to the first Bluetooth headset device 11 during a call. The first Bluetooth headset device 11 will send out a checksum, an encryption parameter/time constant declaration and encrypted voice data.

Figure 5:
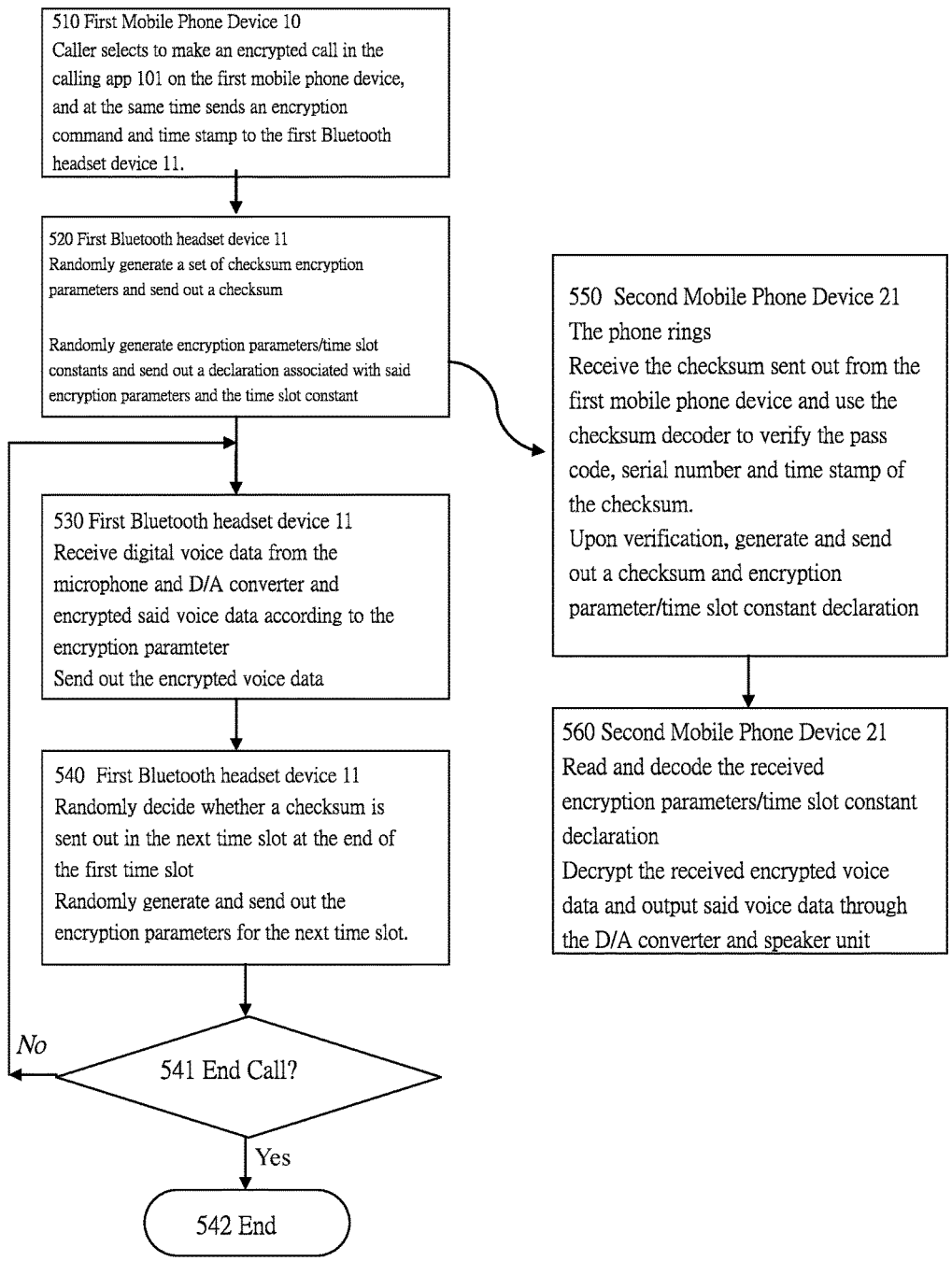
FIG. 5 illustrates the flowchart for encrypted voice data communication.

Please refer to FIG. 5, in which the process of the encrypted voice communication is described in detail:

In step 510, the caller selects to make an encrypted call in the calling app 101 on the first mobile phone device, and at the same time sends an encryption command and time stamp to the first Bluetooth headset device 11.

In step 520, after the Bluetooth headset device 11 receives the encryption command and timestamp, it will:

Randomly generate a set of checksum encryption parameters and send out its own checksum Randomly generate encryption parameters/time slot constants and send out a declaration associated with said encryption parameters and the time slot constant In step 550, the ringtone will ring on the second mobile phone device. The second Bluetooth headset device 21 will receive and verify the checksum sent from the first mobile phone device. If the checksum is successfully verified, the second Bluetooth headset device 21 will send out its own checksum and encryption parameter/time slot constant declaration. If the verification of the checksum fails, the second Bluetooth headset device 21 will alert the second mobile phone device 20.

In step 530, the first Bluetooth headset device 11 will begin encrypted voice communication. Digital voice data received from the first microphone and D/A converter 113 will be encrypted according to the encryption parameters and sent out.

In step 540, at the end of the first time slot of the first Bluetooth headset device 11, it is randomly decided whether a checksum will be sent in the next time slot. Randomly generate and send out the encryption parameters for the next time slot.

In step 541, if yes is selected, the call ends. Otherwise, return to step 530.

In step 560, the second mobile phone device 21 will read and decode the received encryption parameters/time slot constant declaration. The second mobile phone device 21 will receive the encrypted voice data, decrypt the encrypted voice data, and output the decrypted voice data through the second D/A converter and speaker 214.

In step 570, the second mobile phone data sends out voice data:

Send out its own encryption method/time slot constant declaration;

Receive digital voice data from the second microphone and A/D converter 213 and encrypt the voice data according to the encryption parameters.

Another technical feature of the present invention is updating the encryption method of the first Bluetooth headset device and the first microprocessor unit through the first mobile phone device; and updating the encryption method of the second Bluetooth headset device and the second microprocessor unit through the second mobile phone device. Upon issuing an encryption update command, the calling app 101 on the first mobile phone device 10 will send a set of microprocessor source code to the first microprocessor unit 112 in the first Bluetooth headset device 11, and the calling app 201 on the second mobile phone device 20 will send a set of microprocessor source code to the second microprocessor unit 212 in the second Bluetooth headset device 21.

Figure 6:
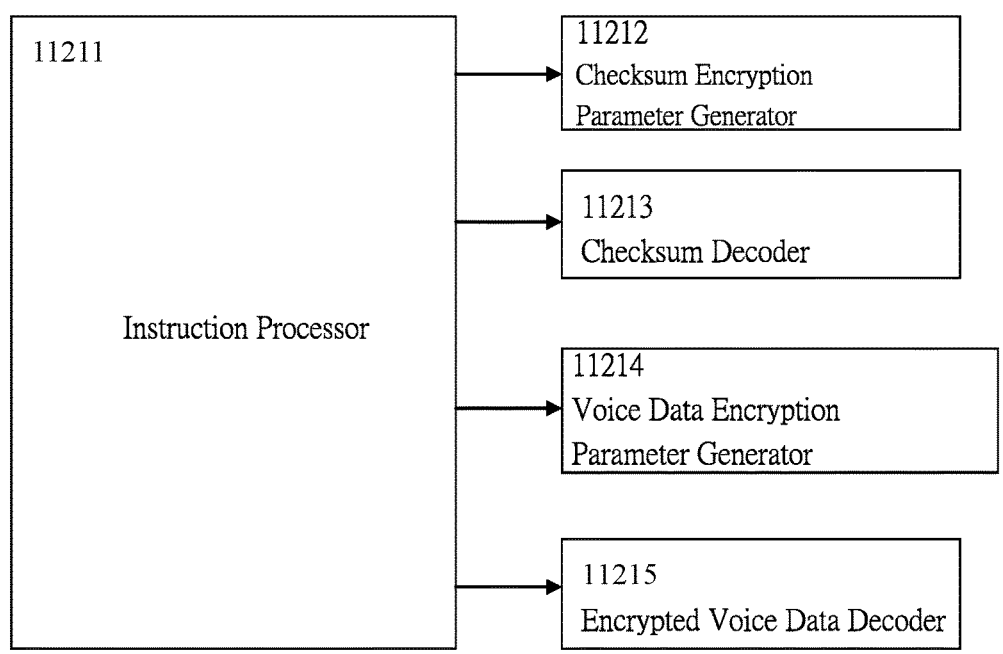
FIG. 6 illustrates the structure of the microprocessor unit in the Bluetooth headset device.

FIG. 6 illustrates the structure of the microprocessor unit in the Bluetooth headset device. Instruction processor 11211: receives commands and data from the calling app 101 and 201 on the first mobile phone 10 and second mobile phone 20. Checksum encryption method generator 11212: randomly generates the checksum and checksum encryption for the current communication or timeslot. Checksum decoder 11213: Decode the received checksum according to the received checksum encryption declaration and report back on the results. Voice data encryption method generator 11214: Randomly generates the encryption parameters for the voice data, encrypts inputted voice data received from the microphone and A/D converter 113,213, and sends the encrypted voice data respectively to the first mobile phone 10 and second mobile hone 20. Encrypted voice data decoder 11215: Decrypts the encrypted voice data according to the received encryption parameter declaration, and outputs the decrypted voice data through the D/A converter and speaker 114, 214.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An anti-eavesdropping system for mobile phone communication, the anti-eavesdropping system comprising:
a first mobile phone device comprising a first built-in Bluetooth module; and
a first Bluetooth headset device, wherein the first Bluetooth headset device comprises:
a battery that provides the power needed for the first Bluetooth headset device;
a Bluetooth controller unit for communicating with the first built-in Bluetooth module of the first mobile phone device; and
a microprocessor unit for performing encryption and decryption, wherein a first terminal of the microprocessor unit is coupled with the Bluetooth controller unit, a second terminal of the microprocessor unit is coupled with an analog-to-digital (A/D) for converting voice signals from a microphone to voice data, and a third terminal of the microprocessor unit is coupled with a digital-to-analog (D/A) converter for converting voice data to voice signals to a speaker, wherein the microprocessor unit of the first Bluetooth headset device encrypts a first voice data outputted by the A/D converter and sends the encrypted first voice data to the first mobile phone device through the Bluetooth controller unit for transferring said encrypted first voice data to a remote second mobile phone device;
and the microprocessor unit of the first Bluetooth headset device decrypts an encrypted second voice data received from the first mobile phone device through the Bluetooth controller unit and outputs the decrypted second voice data to the D/A converter, wherein said encrypted second voice data is transferred to the first mobile phone device from said remote second mobile phone device, wherein the first Bluetooth headset device associated with the first mobile phone device and a second Bluetooth headset device associated with the second mobile phone device are paired for subsequent voice communication therebetween by using a pairing process that is initiated from the first mobile phone device or the second mobile phone device, wherein a first serial number of the first Bluetooth headset device and a first password entered by a first user of the first mobile phone device are associated and stored in the first Bluetooth headset device, and a second serial number of the second Bluetooth headset device and a second password entered by a second user of the second mobile phone device are associated and stored in the second Bluetooth headset device, wherein the first Bluetooth headset device and the second Bluetooth headset device are paired through said pairing process according to the first serial number and the first password that are associated and stored in the first Bluetooth headset device and the second serial number and the second password that are associated and stored in the second Bluetooth headset device.

2. The anti-eavesdropping system according to claim 1, wherein said pairing process to pair the first Bluetooth headset device and the second Bluetooth headset device is initiated from an application program running on the first mobile phone device or the second mobile phone device.

3. The anti-eavesdropping system according to claim 1, wherein the first Bluetooth headset device further comprises an embedded firmware for the microprocessor unit to perform encryption and decryption, wherein the encryption is based on a parameterized encryption with a time slot variation method.

4. The anti-eavesdropping system according to claim 3, wherein a set of program codes is sent from the first mobile phone device to the first Bluetooth headset device, wherein the microprocessor unit updates the embedded firmware according to the set of program codes.

5. The anti-eavesdropping system according to claim 1, wherein the first mobile phone device sends a set of passcodes to the first Bluetooth headset device, wherein the first Bluetooth headset device stores the set of passcodes and the serial number of the first Bluetooth headset device for associating the first mobile phone device with the first Bluetooth headset device.

6. The anti-eavesdropping system according to claim 5, wherein the set of passcodes comprises a synchronization code, a checksum encryption declaration, a time stamp and the serial number of the first Bluetooth headset device.

7. The anti-eavesdropping system according to claim 1, wherein the first mobile phone device uses at least one of the following wireless technologies: GSM, CDMA, CDMA2000, WCDMA, TD-SCDMA and LTE.

8. The anti-eavesdropping system according to claim 1, wherein when the first Bluetooth headset device receives an encryption command and a time stamp from the first mobile phone device, the microprocessor unit randomly generates voice data encryption parameters with a time slot constant and sends out a checksum code and a declaration associated with said voice data encryption parameters and the time slot constant along with said encrypted first voice data.

9. The anti-eavesdropping system according to claim 5, wherein the Bluetooth controller unit is integrated with the microprocessor unit in a chip.

* * * * *